United States Patent [19]

Gottschalk

[11] Patent Number: 5,020,813
[45] Date of Patent: Jun. 4, 1991

[54] BICYCLE DRAWN TRAILER

[76] Inventor: Peter J. Gottschalk, 671 E. Wheelock Pky., St. Paul, Minn. 55106

[21] Appl. No.: 492,822

[22] Filed: Mar. 13, 1990

[51] Int. Cl.$^5$ .............................................. B62K 27/14
[52] U.S. Cl. ..................................... 280/204; 280/483; 280/656
[58] Field of Search ................... 280/62, 63, 202, 204, 280/483, 656; 403/221, 222, 225; 248/218.4, 230, 231.6; 384/125; 267/293

[56] References Cited

U.S. PATENT DOCUMENTS

| | | | |
|---|---|---|---|
| 2,468,985 | 5/1949 | Krotz | 403/225 |
| 4,306,733 | 12/1981 | Cox | 280/204 |
| 4,829,125 | 8/1974 | Davis | 280/204 |
| 4,848,890 | 11/1974 | MacAlpine | 280/204 |

FOREIGN PATENT DOCUMENTS 1187749  9/1959  France .............................. 384/125

OTHER PUBLICATIONS

*Bicycling Magazine*, Mar. 1981, pp.54–55.

Primary Examiner—Charles A. Marmor
Assistant Examiner—Victor E. Johnson
Attorney, Agent, or Firm—Jacobson and Johnson

[57] ABSTRACT

A wheel-supported cart or trailer is removably attached to a bicycle seat post by pullbar means attached to the front end of the cart and a hitch encircling the bicycle seat post. The hitch comprises a separable rigid metal band encircling the bicycle seat post with an interior bushing made out of a relatively stiff but resilient material, the bushing having an inner lip which makes encircling snug contact with the bicycle seat post. The trailer wheels are mounted on each side of the trailer by their own separate axles but in a manner to support the trailer across the underside of the trailer.

8 Claims, 3 Drawing Sheets

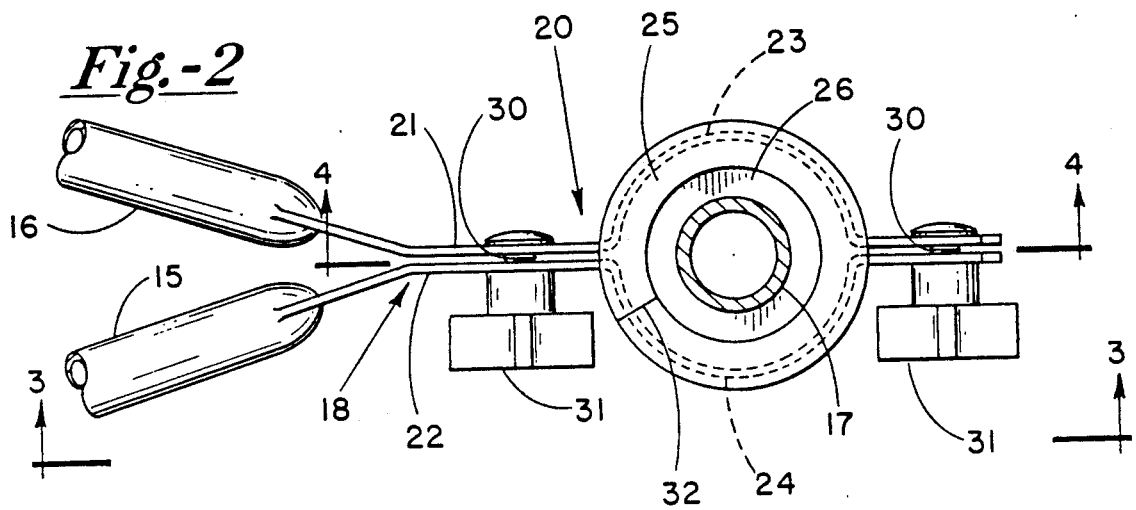
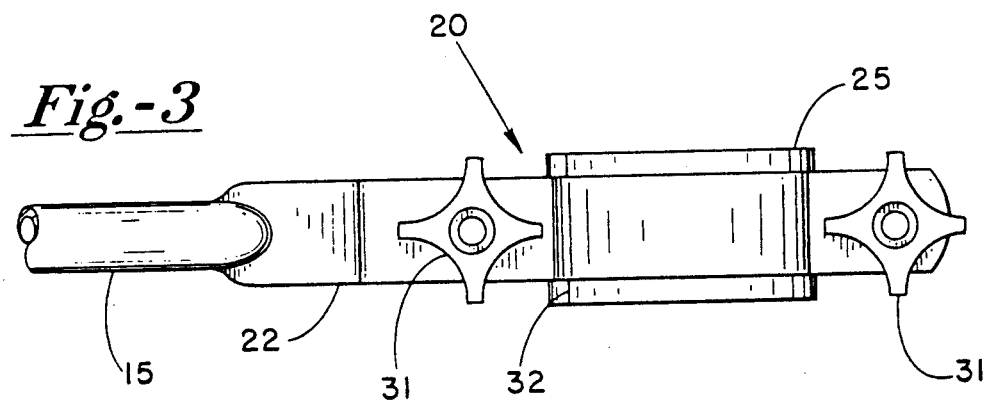
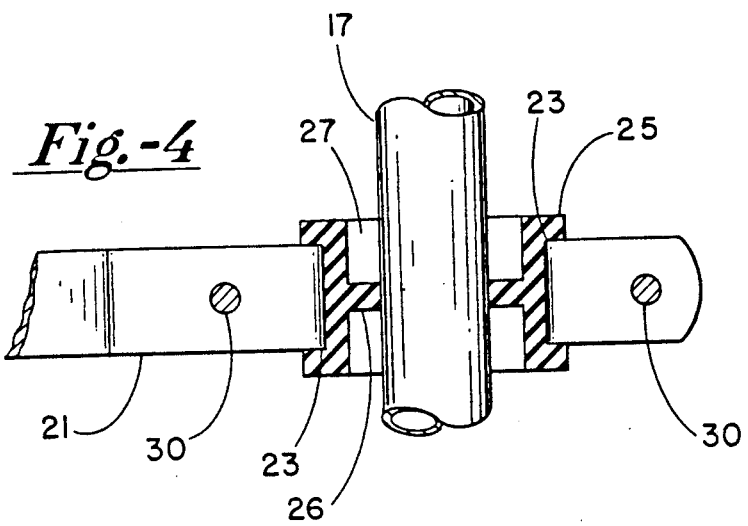

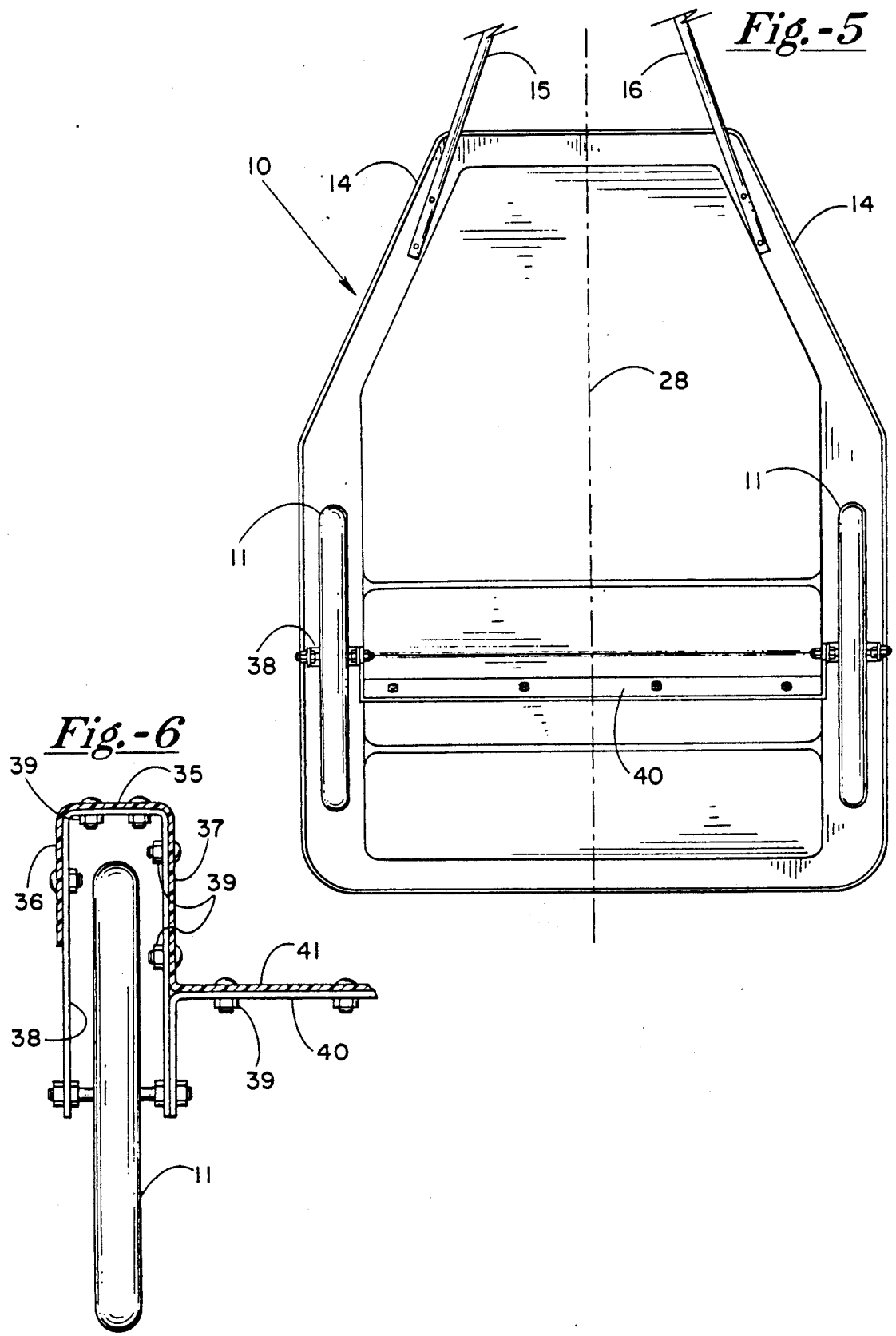

BICYCLE DRAWN TRAILER

FIELD OF THE INVENTION

This invention is directed toward a bicycle drawn trailer or cart and specifically toward the hitching means by which the trailer is attached to a bicycle seat post. Additionally, it is directed towards the means for mounting the body or shell of the trailer to its supporting wheels.

DESCRIPTION OF THE PRIOR ART

The coupling or attachment between a bicycle and the trailer that it is pulling on the one hand must be stable and rigid to the degree that in normal travel the two move together in tandem and, particularly if the trailer is carrying passengers, it maintains a stable line of travel and doesn't freely swing or tip. On the other hand, there has to be sufficient flexibility in the coupling to allow some relative motion between the trailer and the bicycle. For example, if the trailer or the bicycle should hit a bump, it should not cause the other to jar or flip over. Also, when the bicycle is turned, the coupling to the trailer must allow the trailer to make the turn in a smooth fashion. Also, it is preferable that there be enough flexibility in the coupling between the trailer and bicycle, that if one of the trailer wheels should hit and travel over a curb or a large bump, it shouldn't cause the bicycle to fall over on its side. It is also preferable that if the bike should fall or be placed on its side, the coupling should have enough flexibility so that the trailer does not necessarily totally flip over on its side, although it might tilt.

A number of patents have been obtained on means for attaching a trailer to a bicycle. Samples of these are the following:

U.S. Pat. No. 4,413,835 by Hazelett utilizes a somewhat complex universal joint hitch between the trailer tow bar and an attachment to the frame of the bicycle;

U.S. Pat. No. 4,371,184 by Handen, et al. utilizes a U-bolt clamp around the bicycle seat post with a spiggot attached to a flexible tube which has its other end attached to the tow bar extending from the trailer or cart;

U.S. Pat. No. 4,274,649 by Vanderhorst, et al. utilizes a somewhat complex swivel coupled to a ball member between the trailer tow bar and the frame of the bicycle;

U.S. Pat. No. 3,909,042 by Miller attaches one end of the tow bar with a pivot pin or the like to the bicycle seat post and the other end of the tow bar is attached to a sleeve member on the underside of the trailer in a telescopic arrangement;

In U.S. Pat. No. 3,848,890 by MacAlpine one end of the coupling between the trailer and the bicycle is attached around the bicycle seat post by a rigid separable clamp and between this clamp and the trailer is a pair of pivotably joined stirrups which in turn are attached to a swivel coupled to the trailer;

One end of the coupling in U.S. Pat. No. 4,381,117 by French, et al. appears to be attached to the bicycle seat post and between that attachment and the tow bar is a pivot ball along with a combination of shafts and sockets for attachment to the tow bar; and In U.S. Pat. No. 4,077,646 by Watkins the coupling is made by attachment with three rigid separable clamps around the bicycle seat post which are pivotably connected to arms which in turn are connected back to the tow bar through a ball and socket joint arrangement.

A problem with the prior art devices is that in general there is too much flexibility in the coupling or hitch mechanism so that if the trailer should encounter a road hazard it could flip over.

SUMMARY OF THE INVENTION

The trailer body or shell is molded out of polyethylene and is shaped to provide a fairly deep well for carrying passengers, usually children, or cargo. Bicycle-like wheels support the trailer on each side and are attached in a fashion that they have their separate axles yet support the cart across the entire underside. The passengers or cargo face rearward so are protected against any debris that may be thrown backward by the bicycle wheel. In the preferred embodiment, a pair of towbars extend forward from the front sides of the cart toward the bicycle at inward angles until they meet and then are attached to the bicycle by a hitch detachably mounted around the bicycle seat post. The hitch comprises a separable stiff metal band encircling the bicycle seat post and an annular internal bushing made of a suitable stiff but resilient material, such as rubber, surrounding the bicycle seat post. The bushing has an interior lip which encircles and makes snug contact with the bicycle seat post. A pair of threaded bolts and hand operable threaded wing nuts engaged with the bolts are provided to hold the hitch tightly coupled to the bicycle seat post yet allow the hitch and the trailer to be detached from the bicycle if desired. The construction of the hitch is such to provide a good deal of flexibility between the trailer and the bicycle. The trailer will turn smoothly with the bicycle and while bumps of a minor or relatively minor nature encountered by one will not cause corresponding bumping of the other yet, for example, if the trailer should tend to fall over sideways by one of the wheels striking a large bump or riding over a curb, the stability of the attachment to the bicycle seat post is reflected back through the hitch and the tow bars to prevent the cart from falling over on its side even though it may tilt in that direction. This invention allows enough flexibility in the hitch for normal travel yet will prevent the trailer from tipping over. The hitch and tow bar attachment is relatively uncomplicated and the cart can be quickly and easily detached from the bicycle.

In addition, the trailer wheels are mounted to rigid metal bands which support the trailer shell across the underside.

BRIEF DESCRIPTION OF THE DRAWINGS

FIG. 2 is a somewhat enlarged top view showing details of the hitch attachment to the bicycle seat post;

FIG. 3 is a vertical plan view of the hitch;

FIG. 4 is a vertical section view showing the detail of the inner construction of the hitch;

FIG. 5 is a bottom plan view of the trailer or cart; and

FIG. 6 is a partial vertical section illustrating attachment of the wheels to the trailer shell.

DESCRIPTION OF THE PREFERRED EMBODIMENTS

Figure 1:
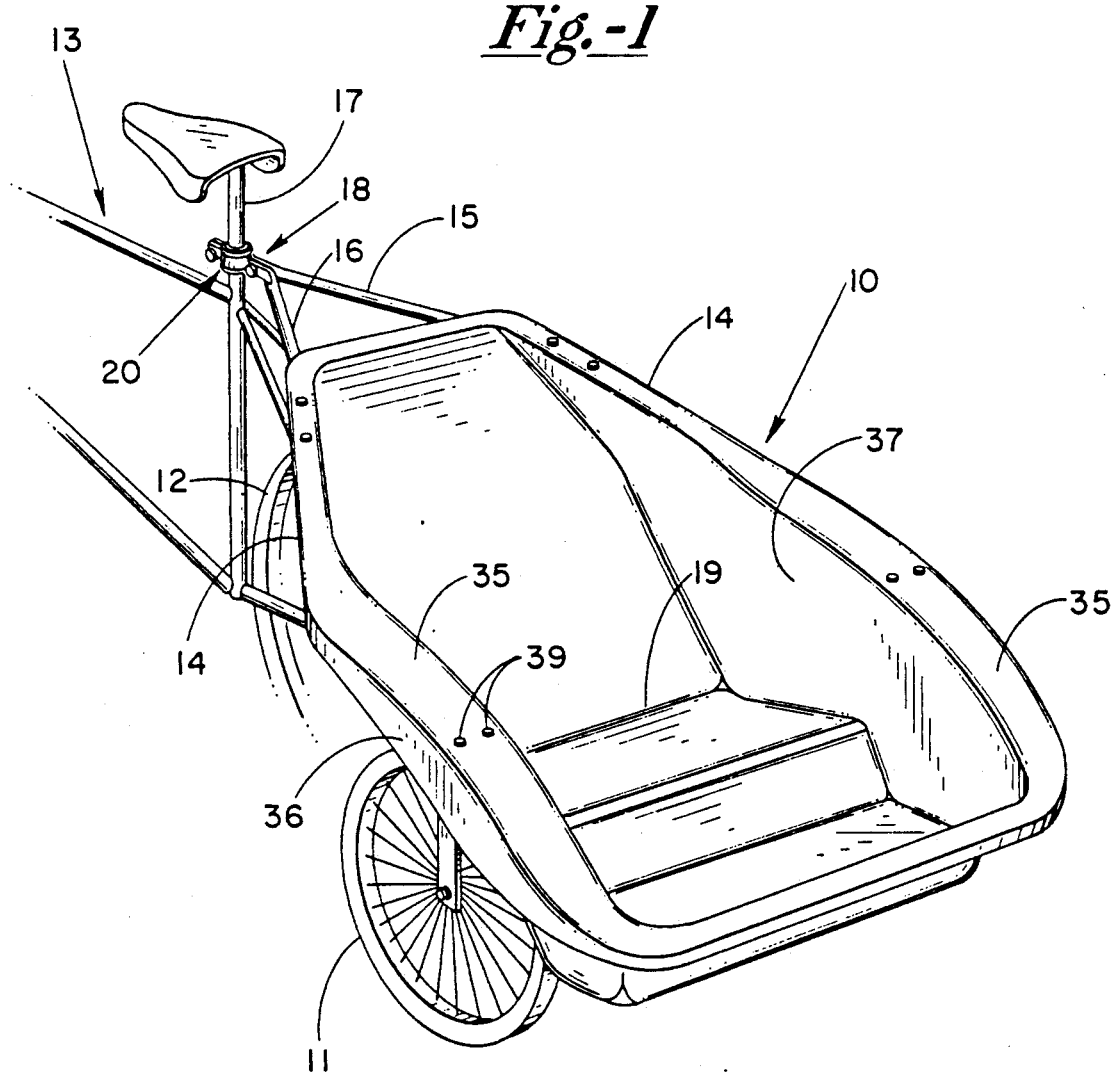
FIG. 1 is a perspective view from the rear left of the bicycle illustrating the manner in which the trailer is attached to the bicycle.

The shell 10 of the trailer is a unitary molded body made out of a suitable relatively stiff material, such as polyethylene, with a built-in ultraviolet inhibitor so it will withstand the rigors of environment and age. It has a relatively deep well or recess 19 preferably shaped to form a seat to accommodate passengers, usually children, but adaptable to hold and carry cargo. The shell or body 10 is supported by a pair of side wheels 11 in a manner to be described later to provide a low center of gravity. Body 10 is open facing rearward and is closed at the front, i.e., toward bicycle 13 and the direction of travel, to protect the occupants or any cargo against any debris that might be kicked up by the rear wheel 12 of bicycle 13. Preferably, toward the front in the area designated by reference numeral 14, the sides of body or shell 10 are angled inwardly. Fixedly attached at one end to the upper front sides 14 of shell 10 by any suitable conventional means, such as by bolts or rivets, are a pair of tow bars 15 and 16 made of some suitable rigid metal. Tow bars 15 and 16 extend forward towards the bicycle seat post 17 at an angle until they meet at a point, forming a "V", generally designated by reference numeral 18. Preferably from their attachment to shell 10 up to point 18 where they meet, tow bars 15 and 16 are round or circular elongated bars or rods. Point 18 can be considered to be in the same plane containing the trailer lengthwise centerline, shown by dashed line 28, running front to back and in the direction of travel, and bicycle seat post 17. At point 18, or just shortly before, preferably tow bars 15 and 16 are flattened and extend forward to form a hitch, generally designated by reference numeral 20, for attachment to bicycle seat post 17. Hitch 20 is formed by two flat metal strips 21 and 22, which can be the flattened portions of towbars 15 and 16 or separate strips attached at one end to the ends of tow bars 15 and 16, extending parallel to one another to the bicycle post 17 and each forming a semicircular band 23 and 24 encircling bicycle seat post 17 and then continuing just beyond support post 17, and an annular bushing 25 clamped between the interiors of bands 23 and 24 and surrounding or encircling seat post 17. Annular bushing 25 is made out of rubber or some other suitable material which has some degree of resiliency and yet is relatively stiff. A suitable material that has been found for use as bushing 25 is a fifty durometer rubber. Along the interior surface of bushing 25 is a circular countersunk lip 26 which makes encircling, snug contact with the exterior of seat post 17. Hitch 20 is removably secured or attached to bicycle seat post 17 by a pair of threaded bolts or rods 30 extending through metal strips 21 and 22 and threadably engaged with hand operable wing nuts 31 at the front of and behind bicycle support post 17. The trailer can be disconnected from the bicycle by loosening nuts 31 and spreading apart the metal bands or strips 21 and 22 far enough so that the bicycle seat post can slip out from between bands 23 and 24. There is enough resiliency in the length of the strips 21 and 22 as well as tow bars 15 and 16 to which they are attached to permit this without bending or loosening the attachment to the trailer cart or body. Bushing 25 may be in the form of a closed ring which is placed on bicycle support post 17 by removing the bicycle seat and slipping the bushing over the end of the post or the bushing may have a slit 32 which will allow the bushing to be wrapped around the post 17 prior to placing bands 23 and 24 around the bushing and later unwrapped for removal.

As shown most clearly in FIG. 4, the upper and lower edges of bushing 25 extend outward over the edges of bands 23 and 24 so that they are more securely held in place and to provide some resilient padding between the bicycle post 17 and the edges of bands 23 and 24.

It has been found that the form of the bushing as well as its composition which produces its relative resiliency, results in the general stability between the bicycle and the drawn trailer. As best seen in FIG. 4, lip 26 makes encircling contact with post 17 but otherwise there is a space or gap 27 between post 17 and the interior of bushing 25. This contributes to the stability because minor bumping and/or swaying of either the bicycle or the trailer is substantially absorbed by the form and the resiliency of the hitch bushing. The elongated tow bars 15 and 16 though relatively rigid also have some degree of give which also may partially contribute to the absorption of relatively minor bumps or sways of the bicycle and/or the trailer. At the same time, however, if the trailer should encounter a major incident by which it could tilt over on its side, such as one of the wheels running over a large bump or jumping a curb, the hitch would keep the trailer upright by virtue of its encirclement about the seat post 17 and attachment to the trailer through tow bars 15 and 16. The relative stiffness of straps 21 and 22 and bands 23 and 24 pressing against the bicycle seat post 17 through bushing 25 would oppose the tendency of the trailer to tilt and thereby keep it from falling on its side.

Each of the wheels 11 is a bicycle style wheel having its own axle. Along the top edge of the side walls 37 of the trailer body or shell 10 are flat rims 35 with downward extending flanges 36 paralleling the side walls 37. A stiff rigid metal strap or bar 38 extends vertically alongside and is attached, by conventional means such as bolts or rivets 39, to the outside of side wall 37 then horizontally across the underside of rim 35 and then vertically downward along the interior of skirt or flange 36 and extends below the bottom edge of flange 36. The axle of wheel 11 is then suitably journalled between the two vertical sections of strap 38 near their lower ends to support the cart on each side. A similar rigid metal strap or bar 40 extends across the underside 41 of body or shell 10 and is attached to strap 38. In this fashion shell 10 is supported entirely across the underside as well as along the sides. The wheels support body or shell 10 across the width of the shell without an elongated axle connecting the two wheels together. If it becomes necessary, the wheels can be individually removed and repaired or replaced in the same fashion as a bicycle wheel can be removed from a bicycle frame.

I claim:

1. A trailer for attachment to a bicycle seat post for being pulled by the bicycle, comprising:
   a generally rigid shell for carrying passengers or cargo in its interior, said shell having a front toward the pulling bicycle, two sides, a bottom and a rear, said shell having a longitudinal center located equidistant between the two sides;
   shell support wheels;
   means for mounting said support wheels to each side of said shell;
   left and right elongated tow bars having two ends, each respectively fixedly attached at one end near the front of the shell, a first section of each of said tow bars extending forward of the shell at an inward angle until they meet at a point in a plane defined by the longitudinal center of the shell and the bicycle seat post;

a second section of each of said tow bars rigidly affixed to said first section of each of said tow bars and extending parallel and adjacent to one another forward of their said meeting point toward the bicycle seat post, each of said second sections forming one-half of a circular band for encircling the bicycle seat post;

a substantially stiff resilient annular bushing within said circular band in encircling contact with the bicycle seat post; and means for releasably holding the second sections of said tow bars firmly together around said bushing.

2. The invention as described in claim 1 wherein said bushing comprises an annular section and inwardly projecting circular lip means on the inner annular surface of said annular section for making snug encircling contact with the bicycle seat post.

3. The trailer as described in claim 1 wherein each of said support wheels has a separate axle; said means for mounting each of said wheels to a side of said shell comprises a rigid metal strap having a first length attached to and extending upward along a side of the shell on the exterior of the shell, a second section extending outward orthogonal to said first section, and a third section extending downward from said second section parallel to and spaced outward from said first section, and means for journalling the wheel axle between said first and third sections.

4. The trailer as described in claim 3 further including another elongated rigid metal strap having two ends, said strap extending across and attached to the bottom exterior of said shell and attached at each end to the first section of said first-mentioned metal strap.

5. The trailer as described in claim 4 wherein said shell has rims extending outward from said sides, said second section of said first mentioned metal straps resting on the underside of said rims.

6. Device for attaching a wheeled trailer to a bicycle seat post on a bicycle for pulling the trailer with the bicycle, said trailer having an interior for carrying passengers or cargo and a front, a rear, two sides and a bottom, said device comprising:

(a) tow bar means having two ends attached at one end to the front of the trailer, said tow bar means extending from its attachment to the trailer toward a forward end in the direction of the bicycle;

(b) hitch means rigidly affixed to the forward end of said tow bar means;

(c) said hitch means comprising a pair of relatively stiff metal strips each having a semicircular section, said semicircular sections facing one another to form a separable circular band having upper and lower edges for encircling a bicycle seat post, a resilient annular bushing located within said circular band, said bushing having an interior circular lip for making encircling contact with the bicycle seat post, and means for releasably securing together said metal strips when said circular band and bushing are encircling said bicycle seat post.

7. The attaching device as described in claim 6 wherein said bushing has a height dimension as measured parallel to the length of the bicycle seat post greater than the height of said metal strips as similarly measured such that said bushing extends beyond and covers over said upper and lower edges of said band.

8. The attaching device as described in claim 7 wherein said lip is located about in the center of the height of said bushing such that there is a gap between the bicycle seat post and the bushing on each side of the lip.

* * * * *